United States Patent
Oh

(10) Patent No.: US 10,674,133 B2
(45) Date of Patent: Jun. 2, 2020

(54) IMAGE DISPLAY DEVICE AND IMAGE DISPLAY METHOD

(71) Applicant: SAMSUNG ELECTRONICS CO., LTD., Suwon-si, Gyeonggi-do (KR)

(72) Inventor: Sung-bo Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 15/311,743

(22) PCT Filed: Mar. 20, 2015

(86) PCT No.: PCT/KR2015/002766
§ 371 (c)(1),
(2) Date: Nov. 16, 2016

(87) PCT Pub. No.: WO2015/178576
PCT Pub. Date: Nov. 26, 2015

(65) Prior Publication Data
US 2017/0094246 A1 Mar. 30, 2017

(30) Foreign Application Priority Data
May 23, 2014 (KR) .................. 10-2014-0062341

(51) Int. Cl.
*H04N 13/128* (2018.01)
*H04N 5/262* (2006.01)
(Continued)

(52) U.S. Cl.
CPC ......... *H04N 13/128* (2018.05); *G06F 3/0482* (2013.01); *G06T 3/0043* (2013.01);
(Continued)

(58) Field of Classification Search
CPC .... H04N 13/128; H04N 13/359; H04N 13/10; H04N 13/261; H04N 2013/0081;
(Continued)

(56) References Cited

U.S. PATENT DOCUMENTS 6,175,379 B1   1/2001  Uomori et al.
6,462,783 B1 * 10/2002  Okayama ........... H04N 1/00291
                                                 348/556
(Continued)

FOREIGN PATENT DOCUMENTS

CN   102812716   12/2012
CN   103455138   12/2013
(Continued)

OTHER PUBLICATIONS

Extended European Search Report dated Dec. 15, 2017 in European Patent Application No. 15795636.8.
(Continued)

*Primary Examiner* — Nathnael Aynalem
(74) *Attorney, Agent, or Firm* — Staas & Halsey LLP

(57) ABSTRACT

Disclosed is an image display device or an image signal output device. The image display device or the image signal output device according to an exemplary embodiment of the present disclosure includes: a receiver for receiving an image; an input unit for receiving a user input to select a display mode or an image signal output mode; a determiner for determining the selected display mode; a depth map generator for generating a depth map for the received image having depth information corresponding to a predefined curvature if the result of determination indicates that the selected display mode is a 3D curved image mode; a 3D image frame generator for generating a left-eye image frame and a right-eye image frame from the received image on the basis of the generated depth map; and an output unit for
(Continued)

outputting the generated left-eye image and right-eye image frames.

15 Claims, 13 Drawing Sheets

(51) Int. Cl.
  *G06T 3/00* (2006.01)
  *G06F 3/0482* (2013.01)
  *H04N 13/261* (2018.01)
(52) U.S. Cl.
  CPC ............ *H04N 5/262* (2013.01); *H04N 5/2628* (2013.01); *H04N 13/261* (2018.05)
(58) Field of Classification Search
  CPC ............. H04N 2213/007; H04N 13/00; H04N 13/356; G02B 27/2228; G06F 1/1652; G06F 3/147
  USPC ...................................................... 348/42, 51
  See application file for complete search history.

(56) References Cited

U.S. PATENT DOCUMENTS

| | | | |
|---|---|---|---|
| 7,959,294 B2 | 6/2011 | Balogh | |
| 8,525,927 B1 | 9/2013 | Chen | |
| 8,675,040 B2 | 3/2014 | Um et al. | |
| 8,879,840 B2 | 11/2014 | Fukuhara | |
| 9,152,225 B2 | 10/2015 | Park et al. | |
| 9,179,120 B2 * | 11/2015 | Chung | H04N 13/128 |
| 2011/0050864 A1 | 3/2011 | Bond | |
| 2011/0122235 A1 * | 5/2011 | Lee | H04N 13/398 348/51 |
| 2012/0026289 A1 | 2/2012 | Suenaga et al. | |
| 2012/0235893 A1 | 9/2012 | Phillips et al. | |
| 2012/0274629 A1 * | 11/2012 | Baek | H04N 13/271 345/419 |
| 2012/0328192 A1 | 12/2012 | Fukuhara | |
| 2013/0038611 A1 | 2/2013 | Noritake et al. | |
| 2013/0057575 A1 * | 3/2013 | An | H04N 13/356 345/619 |
| 2013/0076745 A1 | 3/2013 | Kida et al. | |
| 2013/0093849 A1 | 4/2013 | He et al. | |
| 2013/0155052 A1 | 6/2013 | Ko | |
| 2013/0182944 A1 | 6/2013 | Martin | |
| 2013/0222432 A1 | 8/2013 | Arrasvuori et al. | |
| 2013/0229409 A1 * | 9/2013 | Song | G06T 19/20 345/419 |
| 2013/0321264 A1 | 12/2013 | Park et al. | |
| 2013/0329422 A1 | 12/2013 | Park et al. | |
| 2015/0294438 A1 * | 10/2015 | Kang | G06T 3/0018 345/589 |
| 2015/0381959 A1 * | 12/2015 | Lee | H04N 13/0022 382/154 |

FOREIGN PATENT DOCUMENTS

| | | | | |
|---|---|---|---|---|
| EP | 2582144 | | 4/2013 | |
| JP | 9-121370 | | 5/1997 | |
| JP | 4903240 | | 1/2012 | |
| KR | 10-2008-0061925 | | 7/2008 | |
| KR | 10-2010-0130344 | | 12/2010 | |
| KR | 10-2012-0009862 | | 2/2012 | |
| KR | 10-2012-0069799 | | 6/2012 | |
| KR | 10-2013-0059736 | | 6/2013 | |
| KR | 10-2013-0095655 | | 8/2013 | |
| KR | 10-2013-0101430 | | 9/2013 | |
| KR | 10-2013-0131786 | | 12/2013 | |
| KR | 10-2013-0138614 | | 12/2013 | |
| KR | 10-2014-0037301 | | 3/2014 | |
| KR | 1020140109168 | * | 9/2014 | ......... H04N 13/0022 |
| KR | 20150116302 A | * | 10/2015 | ........... G06T 3/0018 |
| WO | 2013/054243 | | 4/2013 | |

OTHER PUBLICATIONS

Chinese Office Action dated Dec. 15, 2017 in Chinese Patent Application No. 201580023824.3.
International Search Report dated Jun. 12, 2015 in corresponding International Application No. PCT/KR2015/002766.
Written Opinion of the International Search Authority dated Jun. 12, 2015 in corresponding International Application No. PCT/KR2015/002766.
European Communication dated Sep. 18, 2018 in European Patent Application No. 15795636.8.
European Office Action dated Nov. 12, 2019 in European Patent Application No. 15 795 636.8.
Korean Office Action dated Apr. 11, 2020 from Korean Patent Application No. 10-2014-0062341, 9 pages.

* cited by examiner

2D IMAGE

DEPTH MAP IN 3D
PLANAR IMAGE MODE

DEPTH MAP IN 3D
CURVED IMAGE MODE

FIG. 7
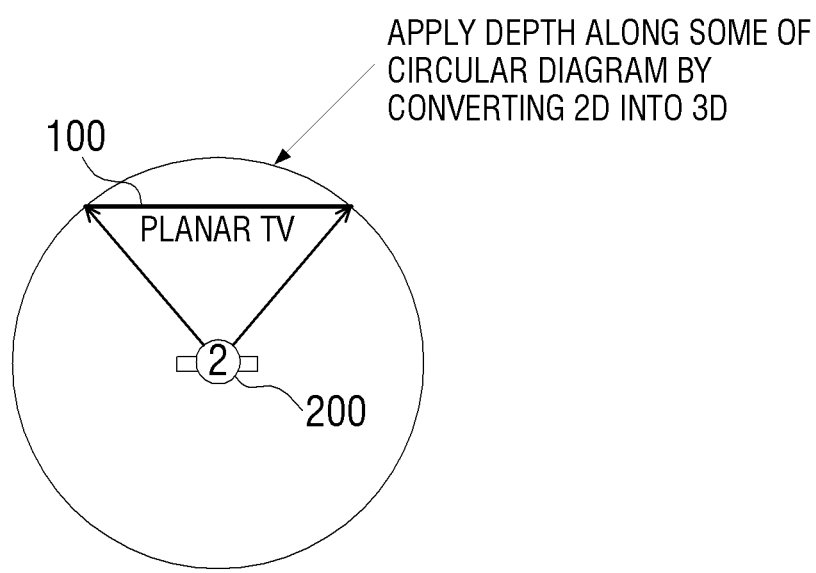
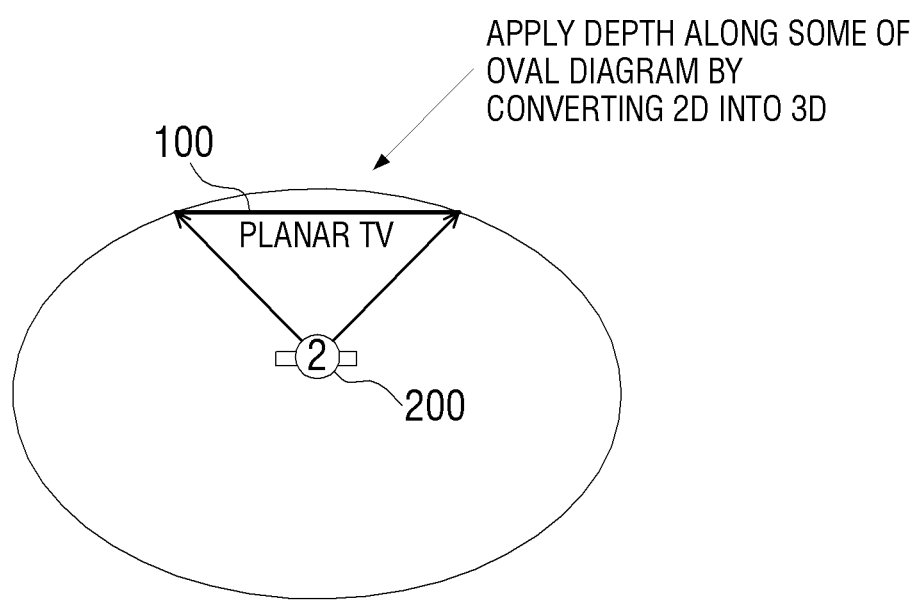

IMAGE DISPLAY DEVICE AND IMAGE DISPLAY METHOD

CROSS-REFERENCE TO RELATED APPLICATIONS

This application is a U.S. National Stage Application, which claims the benefit under 35 U.S.C. § 371 of PCT International Patent Application No. PCT/KR2015/002766, filed Mar. 20, 2015, which claims the foreign priority benefit under 35 U.S.C. § 119 of Korean Patent Application No. 10-2014-0062341, filed May 23, 2014, the contents of which are incorporated herein by reference.

TECHNICAL FIELD

The present disclosure relates to an image display technology, and more particularly, to an image display device, an image signal output device, and an image display method capable of displaying an image having a curved image effect.

BACKGROUND ART

With the development of digital technologies, various types of electronic products have been developed and propagated. Particularly, various display apparatuses such as a television (TV), a cellular phone, a personal computer (PC), a laptop computer, and a personal digital assistant (PDA) have been mostly used even in most homes.

As the use of display devices is increased, user needs for various functions have increased. Therefore, each electronic manufacturer to satisfy the user needs have also made a lot of efforts, such that products having a new function that is not present in the past have been successively launched.

Recently, a curved TV that makes a screen look curved has been developed as a new technology. The curved image that is viewed by the curved TV may give magnificence and realism of the image to a viewer and increase immersion of the viewer in the image. For this reason, a high-end display device adopts an OLED display panel to release a curved display device.

However, there is a problem in that the curved TV is expensive and takes up a large space due to the curved surface. Accordingly, a technology of enabling a viewer to view an image having a curved image effect using the existing flat panel TV is required.

DISCLOSURE

Technical Problem

An object of the present disclosure is to provide an image display device, an image signal output device, and an image display method capable of feeling an image as if a viewer views a curved image using a flat panel.

Technical Solution

According to an aspect of the present disclosure, an image display device includes: a receiver for receiving a two-dimensional image; an input unit for receiving a user input for selecting a display mode; a determiner for determining the selected display mode; a depth map generator for generating a depth map having depth information corresponding to a predefined curvature, if the result of the determination indicates that the selected display mode is a 3D curved image mode; a 3D image frame generator for generating a left-eye image frame and a right-eye image frame from the received image on the basis of the generated depth map; and an output unit for outputting the generated left-eye image frame and right-eye image frame.

If the result of the determination indicates that the selected display mode is a 3D planar image mode, the depth map generator may generate the depth map having the depth information on each region (object) of the received image.

If the result of the determination indicates that the selected display mode is a 3D curved image mode, the depth map generator may generate a depth map for the received image having depth information corresponding to a curvature of an oval or a circle.

Further, the generated depth map may have the depth value reduced from the central portion of the received image toward the side portion thereof.

The input unit may include a display for displaying a user menu for selecting the display mode.

The input unit may receive a user input for a curvature selection and if the user input for the curvature selection is received, the depth map generator may generate a depth map for the received image having depth information corresponding to the selected curvature.

If the result of the determination indicates that the selected display mode is a 2D planar image mode, the output unit may output a 2D image using the received image without generating the depth map, the left-eye image frame, and the right-eye image frame.

The image display device may further include: a scaler for scaling the received image to have different scaling ratios for each region of a screen if the result of the determination indicates that the selected display mode is a 2D curved image mode, wherein the output unit uses the scaled image data to output a 2D image.

If the selected display mode is a 2D curved image mode, the scaler may have a down-scaling extent increased from a side portion of the received image toward a central portion thereof to perform the scaling.

As the result of the scaling, the scaler may fill a void region occurring due to the scaled image down-scaled over the received image with one color (for example, black color) image.

According to another aspect of the present disclosure, an image display method includes: receiving an image data; receiving a user input for selecting a display mode; determining the selected display mode; if the result of the determination indicates that the selected display mode is a curved image mode, generating a depth map for the received image data having depth information corresponding to a predefined curvature; generating a left-eye image frame and a right-eye image frame from the received 2D image data on the basis of the generated depth map; and outputting the generated left-eye image frame and right-eye image frame.

If the result of the determination indicates that the selected display mode is a 3D planar image mode, in the generating of the depth map, a depth map having depth information on each region (object) of the received image may be generated.

If the result of the determination indicates that the selected display mode is a 3D curved image mode, in the generating of the depth map, a depth map for the received image having depth information corresponding to a curvature of an oval may be generated.

Further, the generated depth map may have the depth value reduced from the central portion of the received image toward the side portion thereof.

The image display method may further include displaying a user menu for selecting the display mode.

Further, the image display method may further include receiving the user input for the curvature selection, and if the user input for the curvature selection is received, in the generating of the depth map, the depth map for the received image having the depth information corresponding to the selected curvature may be generated.

Further, if the result of the determination indicates that the selected display mode is the 2D planar image mode, in the outputting, the 2D image may be output using the received 2D image without generating the depth map, the left-eye image frame, and the right-eye image frame.

According to another aspect of the present disclosure, an image display method includes: receiving an image data; receiving a user input unit for selecting a display mode; determining the selected display mode; if the result of the determination indicates that the selected display mode is a curved image mode, generating a depth map for the received image data having depth information corresponding to a predefined curvature; generating a left-eye image frame and a right-eye image frame from the received image data on the basis of the generated depth map; and outputting the generated left-eye image frame and right-eye image frame.

The image display method may further include: if the result of the determination indicates that the selected display mode is the 2D curved image mode, scaling the received image to have different scaling ratios for each region of a screen and outputting the 2D image using the scaled image data.

If the selected display mode is the 2D curved image mode, in the scaling, the down-scaling extent may be increased from the side portion of the received image toward the central portion thereof to perform the scaling.

As the result of the scaling, in the scaling, the void region occurring due to the scaled image down-scaled over the received image may be filled with one color (for example: black color) image.

Advantageous Effects

As described above, various exemplary embodiments of the present disclosure provide the image display device, the image signal output device, and the image display method capable of feeling the image as if the viewer views the curved image using the flat panel.

DESCRIPTION OF DRAWINGS

FIG. 7 is a diagram illustrating the change in curvature according to a kind of circles.

BEST MODE

Hereinafter, various exemplary embodiments of the present disclosure will be described in detail with reference to the accompanying drawings.

Figure 1:
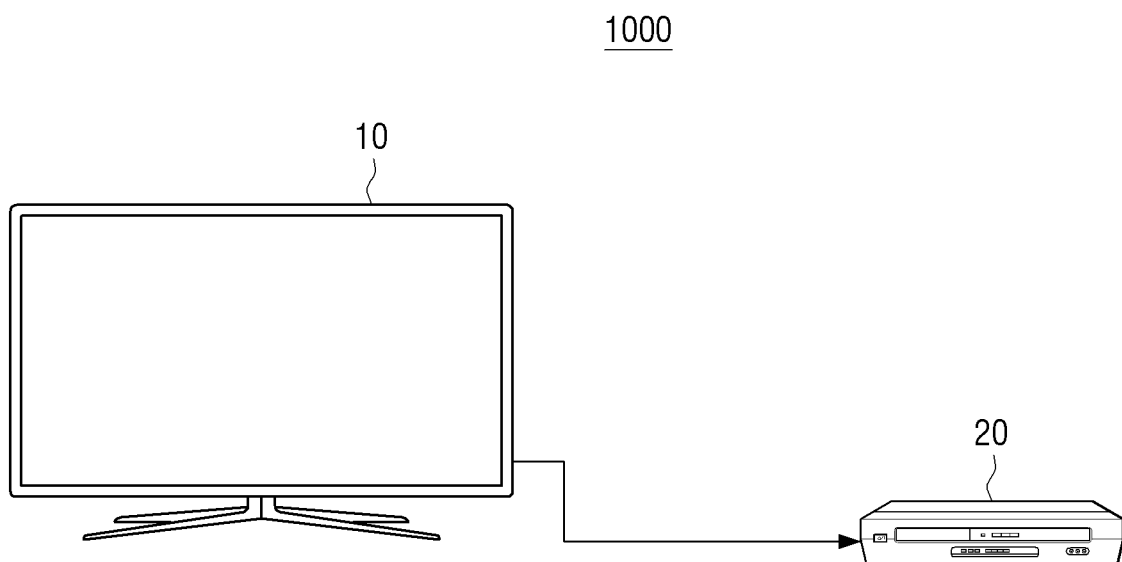
FIG. 1 is a diagram illustrating a configuration of an image display system according to an exemplary embodiment of the present disclosure.

FIG. 1 is a diagram illustrating a configuration of an image display system 1000 according to an exemplary embodiment of the present disclosure.

As illustrated in FIG. 1, the image display system 1000 according to the exemplary embodiment of the present disclosure may include a display device 10 and an image signal output device 20. In this case, the image signal output device 20 may receive a content image or read the image from an optical disc and receive an input for a display mode from a user. The user input may also be made by the display device 10. When the display mode is a 3D curved image mode, the image signal output device 20 generates a depth map for an image having depth information corresponding to a predefined curvature. The 3D curved image mode is a mode that displays an image as a 3D curved image. The 3D curved image means an image in which each region of the displayed image has different depths according to the predetermined curvature.

Further, the image signal output device 20 generates a left-eye image frame and a right-eye image frame for the 3D image based on the generated depth map. The display device 10 may output the left-eye image frame and the right-eye image frame. Alternatively, the function of the image signal output device 20 may also be implemented to be performed by the display device 10.

In the display device 10, the curved 3D image may have a depth value that is reduced from a central portion of the image toward a side portion thereof, such that a stereo effect may be great at the central portion of the image and may be reduced toward the side portion thereof. Therefore, user's feeling distances for each region of the image may be same in a horizontal direction or may be slightly increased toward the side portion of the image, such that a user may get a feeling like viewing a curved display. The present disclosure provides the 3D curved image mode. A configuration and an operation of the display device 10 and the image signal output device 20 will be described below in more detail.

Figure 2:
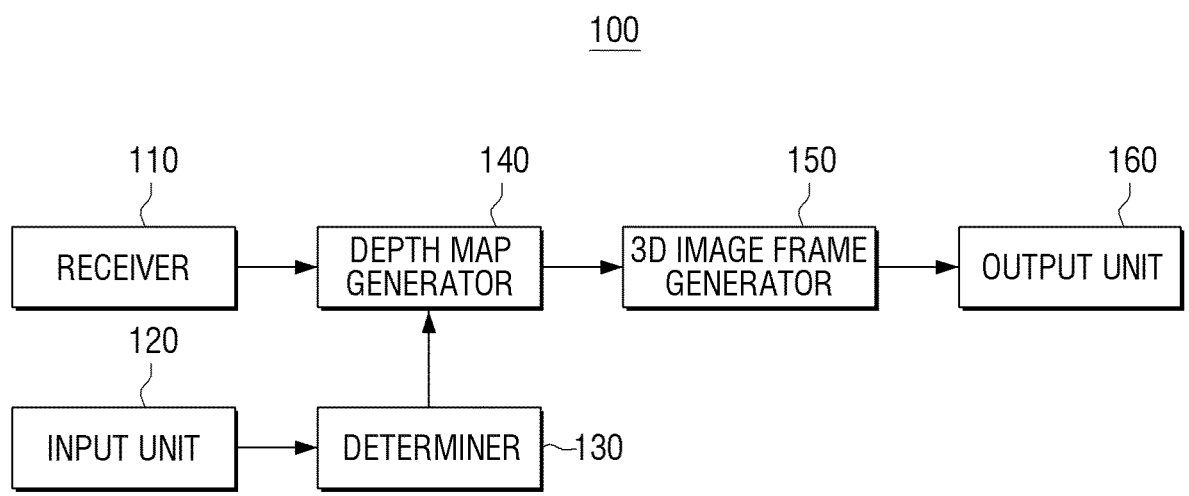
FIG. 2 is a block diagram illustrating a configuration of an image display device according to an exemplary embodiment of the present disclosure.

FIG. 2 is a block diagram illustrating a configuration of an image display device according to an exemplary embodiment of the present disclosure.

An image display device or an image signal output device 100 according to an exemplary embodiment of the present disclosure is a device that includes one or more displays or may output an image signal and a device that is configured to execute an application or display a content and may be implemented by at least any one of, for example, a digital television, a tablet personal computer (PC), a portable multimedia player (PMP), a personal digital assistant (PDA), a smart phone, a cellular phone, a digital frame, a digital signage, a Blu-ray player, a set top box, a media player, a DVD Player, a home theater system, a home entertainment system, a multimedia player, and a kiosk.

Further, the image display device or the image signal output device 100 according to the exemplary embodiment of the present disclosure supports a 2D image, 3D image display or a 2D image, 3D image signal output as described below. The 3D image display device or the image signal output device may be implemented by various technologies. That is, when displaying the 3D image or outputting the 2D image signal, 3D image signal, the image display device or the image signal output device 100 may alternately display the left-eye image frame and the right-eye image frame or output the 3D image signal or may simultaneously display the left-eye image frame and the right-eye image frame on different regions of a screen or output the 3D image signal. The user may also view the 3D image with wearing shutter glass, polarized glass, or anaglyph glasses or without wearing it. As such, the present disclosure may be applied to various types of 3D image technologies.

Referring to FIG. 2, the image display device or the image signal output device 100 according to the exemplary embodiment of the present disclosure includes a receiver 110, an input unit 120, a determiner 130, a depth map generator 140, a 3D image frame generator 150, and an output 160.

The receiver 110 is configured to receive each image content including an image and information associated with the image contents via an external device or going through content processing (for example: content decoding). The receiver 110 may receive a broadcast program content from a broadcasting station using a broadcasting network, receive a content from a web server using the Internet, decode and receive a content within an optical disc (for example: Blu-ray disc), and process and receive a file type content. Further, the receiver 110 may also receive an image from various kinds of recording medium players that are installed within the image display device or the image signal output device 100 or connected thereto. Here, the recording medium player means a device of playing a content stored in various types of recording mediums such as a CD, a DVD, a hard disc, a Blu-ray disc, a memory card, and a USB memory.

When receiving an image from a broadcasting station, the receiver 110 may include a tuner (not illustrated), a demodulator (not illustrated), or the like.

The tuner selects an RF broadcasting signal corresponding to a selected channel among RF broadcasting signals received through an antenna and converts the selected RF broadcasting signal into an intermediate frequency signal or a baseband image or a sound signal. If the selected RF broadcasting signal is a digital broadcasting signal, the selected RF broadcasting signal is converted into a digital IF signal and if the selected RF broadcasting signal is an analog broadcasting signal, the selected RF broadcasting signal is converted into an analog baseband image or a sound signal (CVBS SIF). The output signal is input to the foregoing receiver 110. The tuner may receive an RF broadcasting signal of a single carrier according to an advanced television system committee (ATSC) scheme or an RF broadcasting signal of plural carriers according to a digital video broadcasting (DVB) scheme.

The demodulator (not illustrated) receives the digital IF signal converted by the tuner and demodulates the received digital IF signal. When the digital IF signal output from the tuner depends on the ATSC scheme, the demodulator performs 8-vestigal side band (VSB) demodulation. When the digital IF signal output from the tuner depends on the DVB scheme, the demodulator performs coded orthogonal frequency division modulation (COFDMA) demodulation. Further, the demodulator may perform channel decoding such as trellis decoding, deinterleaving, and Reed Solomon decoding.

When the channel decoding is performed, a stream signal (TS) is output. The stream signal may be a multiplexed signal of an image signal, a sound signal, and a data signal. For example, the stream signal may be MPEG-2 TS in which an image signal of MPEG-2 standard, a sound signal of Dolby AC-3 standard, etc. are multiplexed. The stream signal output from the demodulator is input to a signal processor (not illustrated).

Unlike this, the receiver 110 may also receive a content from an external server like a web server. In this case, the receiver 110 may be implemented by a network interface card (not illustrated). In this case, the image display device or the image signal output device 100 and the web server may follow TCP/IP that is a standard protocol for information transmission in the Internet. The TCP is a rule about a technology of dividing transmission data in a predetermined unit and packing them and the IP is a rule about a technology of directly transmitting and receiving data.

The receiver 110 may receive a content from various external devices in addition to the Internet. For this purpose, the receiver 110 may include a composite video banking sync (CVBS) terminal, a component terminal, an S-video terminal (analog), a digital visual interface (DVI) terminal, a high definition multimedia interface (HDMI) terminal, an RGB terminal, a D-SUB terminal, an IEEE1394 terminal, an SPDIF terminal, a liquid HD terminal, a USB terminal, etc.

Further, the receiver 110 may include various wireless communication modules. The receiver 110 may include a short range communication module such as a WIFI module, a Bluetooth module, an infrared data association (IrDA) module, a near field communication (NFC) module, a Zigbee module, a radio frequency identification (RFID) module, an ultra wideband (UWB) module. Further, the receiver may also be implemented by a third generation mobile communication module such as a wideband CDMA (WCDMA), a high speed downlink packet access (HSDPA), a high speed uplink packet access (HSUPA), and a high speed packet access (HSPA), a fourth generation mobile communication module such as a mobile WiMAX and a WiBro, and a fourth generation long term evolution module.

Further, the receiver 110 may also receive a content from a set top box. The set top box may support two-way communication to support IP TV.

Further, when being applied to the image signal output device, the receiver 110 may also receive a content decoded by a decoder of a Blu-ray disc player and a content decoded by a decoder of a media player from a part that takes charge of decompressing a content of a content reproducing device.

The receiver 110 may include at least one of various technical components as described above and may receive the contents from a plurality of different modules and the signal processor may perform signal processing on each of the contents received from each module to generate a multi content view.

The input unit 120 is a component receiving a user input. For this purpose, the input unit 120 may include at least one physical button or a touch panel. A user presses a button or touches an object on a touch panel to generate the corresponding control command and the image display device or the image signal output device 100 is operated according to the generated control command.

Unlike this, the input unit 120 includes a near field communication module as described above and thus may receive a control signal transmitted from a remote controller. The user presses a button of a remote control, etc. to generate a control command from the remote control and receives the generated control command and transfers the received control command to a controller (not illustrated). When the remote control includes a touch panel or a motion sensor, a touch of the user or the movement of the remote control generates the control command.

When a glasses device (not illustrated) for viewing a 3D content image is provided, the glasses device may include a function of the remote control. That is, when a button located at the glasses device is pressed or the touch pad is touched, the corresponding control command may be generated to be transmitted to the image display device or the image signal output device 100.

To recognize a user's gesture, the input unit 120 may include a means for photographing the user's gesture. That is, the image display device or the image signal output device 100 includes at least one camera and processes an optical signal sensed by a camera to generate an image. Further, the image display device or the image signal output device 100 detects a change rate of the image over time to recognize the user's gesture and change the recognized gesture to the control command.

Unlike this, the input unit 120 may also recognize a user's voice to generate the corresponding control command.

As described below, the input unit 120 may further include a display (not illustrated) that displays a user menu for selecting the display mode. However, the display may serve to display a 2D or 3D image regardless of the input. This will be described below.

The determiner 130 determines the selected display mode. The image display device or the image signal output device according to the present disclosure supports a plurality of display modes. That is, the image display device or the image signal output device 100 may display an image according to any one of a 2D planar image mode, a 2D curved image mode, a 3D planar image mode, and a 3D curved image mode.

The 3D image means an image that uses a multiview image representing the same object at different views to enable a user to feel a three-dimensional effect. On the contrary, the 2D image means an image consisting of an image frame represented at one view. The 3D image includes depth information that represents an extent of the three-dimensional effect.

The depth information is information representing the depth of the 3D image and is information corresponding to an extent of binocular disparity between a left-eye image frame and a right-eye image frame of the 3D image frame. The three-dimensional effect that the user feels is different on the basis of the depth information. That is, when the depth is large, the left and right binocular disparity is large, and therefore the user feels as if the three-dimensional effect is relatively large and when the depth is small, the left and right binocular disparity is small, and therefore, the user feels as if three-dimensional effect is relatively small.

Hereinafter, a relationship between the binocular disparity and the 3D effect will be described briefly.

Generally, the three-dimensional effect that the user perceives is generated by a composite interaction of a change extent in thickness of an eye lens on the basis of a location of an object to be observed, an angle difference between both eyes and an object, a difference in a location and a form of the object visible to left and right-eyes, disparity generated on the basis of the movement of the object, an effect by various kinds of psychologies and memories, or the like.

Among those, the binocular disparity that appears due to human eyes located from each other by about 6 to 7 cm in a horizontal direction may be considered as the most important factor of the three-dimensional effect. That is, a person views an object with the angle difference due to the binocular disparity, and images entering both eyes are different due to the difference. In this case, if the two images are transferred to a brain through a retina, the brain accurately fuses the two pieces of information to enable him/her to feel an intact 3D image.

Therefore, if human eyes alternately (or simultaneously) view the same image (or object) by the image display device through the left and right eyes, an angle difference between the views is generated, and therefore the binocular disparity is generated. In this case, if a phase difference in left and right directions is given to a left-eye image and a right-eye image, the binocular disparity is larger, and therefore an optical illusion that makes the 2D image feel as the 3D image Occurs. The optical illusion gives the 3D image to the user.

Next, the display mode provided by the image display device or the image signal output device 100 according to the present disclosure will be described. The 2D planar image mode is a mode that displays the received image as the 2D planar image. When the received image is 2D, generally, the display mode performs only the image processing that the display device performs to display an image as a 2D image. However, when the received image is a 3D image, the display mode may convert the 3D image into the 2D image. The conversion of the 3D image into the 2D image is performed by an inverse process converting the 2D image into the 3D image. A technology of converting a 2D image into a 3D image will be described below.

In the case of the 2D planar image mode, the output unit 160 to be described below uses the received image to output the 2D image without generating the depth map, the left-eye image frame, and the right-eye image frame.

The 2D curved image mode is a mode that displays the received image as a 2D curved image. When the received image is 2D, the received image is converted into the 2D curved image, having different scaling extents for each region of an image. This will be described in detail with reference to an embodiment to be described below. When the received image is 3D, the received image is first converted into the 2D image and then goes through the foregoing process.

The 3D planar image mode is a mode that displays the received image as the 3D planar image. That is, the left-eye image and the right-eye image are generated from the received image and the left-eye image and the right-eye image are alternately displayed in different regions of the screen.

The 3D curved image mode is a mode that displays the received image as the 3D curved image. The 3D curved image means an image in which each region of the displayed image has different depths according to a predetermined curvature. For example, a depth value may be reduced from a central portion of an image toward a side portion thereof, such that a stereo effect may be great at the central portion of the image and may be reduced toward the side portion thereof. Therefore, the user's feeling distance for each region of the image in the horizontal direction may be same or may be slightly increased toward the side portion. The user may get a feeling as if he/she views the curved display. The present disclosure provides the 3D curved image mode. For the purpose, the technical configuration will be described below in more detail.

The determiner 130 determines a display mode or a signal output mode according to the user input. If the display mode selected according to the user input is the 3D planar image mode or the 3D curved image mode, the depth map generator 140 generates the depth map.

The depth map generator 140 is configured to generate the depth map. The depth map means a table including the depth information on each region of the display screen. The region may also be divided into a pixel unit and may also be defined as a region having a predefined size larger than the pixel unit. In this case, the depth information may be a depth for each region or pixel of the 3D image frame. According to one exemplary embodiment, the depth map may be represented by a 2D image of a gray scale that represents the depths for each pixel of the image frame.

If the selected display mode or the output mode is the 3D curved image mode, the depth map generator 140 generates the depth map for the received image having the depth information corresponding to the predefined curvature. The 3D curved image is an image in which each region of the image displayed has different depths according to the predetermined curvature, and therefore has a depth value reduced from the central portion of the image toward the side portion thereof in the depth map. Therefore, if the image is configured according to the depth map, the user feels as if an object at the central portion of the image is located farther over an original image and an object at the side portion of the image is located nearer over the original image. Therefore, the user's feeling distance for each region of the image in the horizontal direction may be same or may be slightly increased toward the side portion. The user may get a feeling like viewing the curved display and may get a feeling as if the image of the screen is displayed in a panorama form surrounding the same. The predefined curvature may be a curvature for a circular arc or a curvature for an oval arc.

On the other hand, if the selected display mode is the 3D planar image mode, the depth map generator 140 generates the depth map for generating the general 3D planar image. First, the depth map generator 140 analyzes the received image. Further, the depth map generator 140 generates an appropriate depth map according to characteristics of an image. For example, when the image is a sports image, the depth map generator 140 generates a depth map corresponding thereto. In this process, an object included in the image is identified. The same one object has distance information different from another object differentiated therefrom, and therefore the depth information on the same one object is determined within a predetermined range.

Figure 3A:
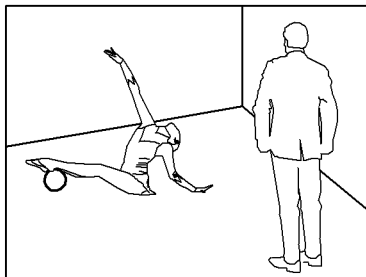
FIGS. 3A to 3C are comparative diagrams of a depth map of a 3D planar image mode and a depth map of a 3D curved image mode.
Figure 3B:
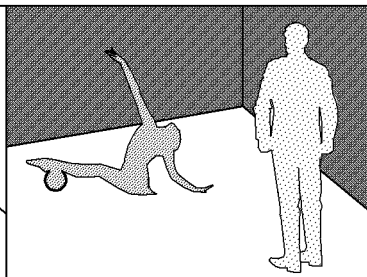
Figure 3C:
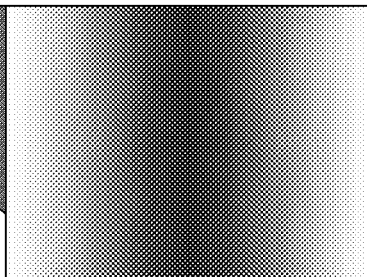

FIGS. 3A to 3C are comparative diagrams of a depth map of a 3D planar image mode and a depth map of a 3D curved image mode.

FIG. 3A illustrates the 2D image. If the received image is 2D, the received image is the same as FIG. 3A. FIG. 3B illustrates the depth map of the 3D planar image mode. As described above, a general depth map for the 3D planar image is generated in the 3D planar image mode. That is, as illustrated in the drawings, the object of the image is identified and the depth map having different depth information on each object is generated. FIG. 3C illustrates the depth map of the 3D curved image mode. As illustrated, in the curved image mode, it may be appreciated that the depth map in which the depth is large at the central portion of the screen and the depth is reduced toward the side portion of the screen is generated.

The 3D image frame generator 150 is configured to generate the left-eye image frame and the right-eye image frame from the received image on the basis of the generated depth map. The 3D image frame generator 150 generates the left-eye image frame in which the 2D image frame is shifted to the right by a predefined location and the right-eye image frame in which the 2D image frame is shifted to the left by a predefined location. In the case of making the environment that the left-eye image frame may be viewed with a left-eye and the right-eye image frame may be viewed with a right-eye, a viewer feels the 3D effect. In the case of the shutter glass scheme, the left-eye image and the right-eye image may have a higher frame rate than the original 2D image. The operation may be performed by a frame rate converter (not illustrated) to be described below.

That is, the frame rate converter converts the frame rate of the 3D image frame by referring to the output rate of the image display device or the image signal output device 100. For example, if the image display device or the image signal output device 100 is operated at 60 Hz, the frame rate converter may convert the frame rates of each 3D image frame into 120 Hz.

Unlike this, the left-eye image frame and the right-eye image frame may also be displayed in different regions of the screen. In this case, the foregoing frame rate conversion is not required.

The output unit 160 is configured to output the generated left-eye image frame and right-eye image frame. All kinds of 3D image output technologies may be applied to the image display device or the image signal output device 100 according to the present disclosure. According to the purpose, the image display device or the image signal output device 100 may alternately output the left-eye image frame and the right-eye image frame or may simultaneously output left-eye image frame and the right-eye image frame to different display regions. Alternatively, the left-eye image frame and the right-eye image frame may alternately be output to the different display regions.

The output unit 160 uses the signal processed image signal to display an image. The output unit 160 includes the frame rate converter (not illustrated) and a video enhancer (not illustrated) and the display module (not illustrated) or the image signal output device includes a signal output. The video enhancer removes deterioration or noise of the image to store the processed image data in a frame buffer. The frame rate converter adjusts a frame rate and transfers an image data of the frame buffer to the display module according to the set frame rate.

The display module is a circuit configuration for outputting the image to the display panel (not illustrated) and may include a timing controller (not illustrated), a gate driver (not illustrated), a data driver (not illustrated), and a voltage driver (not illustrated).

The timing controller (not illustrated) generates a gate control signal (scanning control signal) and a data control signal (data signal) and realigns received R, G, and B data and supplies them to the data driver (not illustrated). The gate driver (not illustrated) applies a gate on/off voltage (Vgh/Vgl) supplied from the voltage driver to the display panel according to a gate control signal generated by the timing controller. The data driver (not illustrated) completes scaling according to the data control signal generated by the timing controller (not illustrated) and inputs the RGB data of the image frame to the display panel. The voltage driver (not illustrated) generates a driving voltage and transfers the generated driving voltage to each of the gate driver, the data driver, and the display panel, or the like.

The display panel may be designed by various technologies. That is, the display panel may be configured by any one of an organic light emitting diode (OLED), a liquid crystal display (LCD) panel, a plasma display panel (PDP), a vacuum fluorescent display (VFD), a field emission display (FED), and an electro-luminescence display (ELD). Further, the display panel is mainly implemented by a light emitting type display, but may also be implemented by a reflective display (E-ink, P-ink, photonic crystal). In addition, the display panel may be implemented by a flexible display, a transparent display, or the like.

In particular, the display panel according to the present disclosure may be implemented by a flat display panel. The present disclosure does not rule out the application of the curved display panel, but the present disclosure provides a technology of enabling a flat display panel to have the same viewing effect as the curved panel.

Further, although not illustrated, the image display device or the image signal output device 100 according to the present disclosure further includes a signal processor (not illustrated) and a scaler (not illustrated). The scaler will be described below.

The signal processor is configured to perform signal processing on image information and voice information configuring an image content. When receiving the stream signal, the signal processor demultiplexes the received stream signal to separate an image signal, a sound signal, and a data signal. When the demultiplexed image signal is an encoded image signal, the signal processor uses a decoder to perform decoding on the image signal. For example, an encoded image signal of MPEG-2 standard may be decoded by an MPEG-2 decoder and an image signal of H.264 standard of digital multimedia broadcasting (DMB) or DVB-H may be decoded by an H.264 decoder. Further, the signal processor may process brightness, tint, color tone, or the like of the image signal.

Further, the signal processor may also process the demultiplexed voice signal. For example, the encoded voice signal of MPEG-2 standard may be decoded by the MPEG-2 decoder and an encoded voice signal of MPEG 4 bit sliced arithmetic coding (BSAC) standard of terrestrial digital multimedia broadcasting (DMB) may be decoded by an MPEG-4 decoder. Further, an encoded voice signal of MPEG-2 advanced audio codec (AAC) standard of the DMB scheme or the DVB-H scheme may be decoded by an AAC decoder. In addition, bass, treble, a sound volume, or the like may be controlled.

Further, the signal processor may perform data processing on the demultiplexed data signal. The encoded data may be decoded and as the encoded data, an electric program guide (EPG) representing information on program broadcast from each channel may be included. The EPG may be ATSC-Program and System Information Protocol (TSC-PSIP) information in the case of the ATSC scheme and may include DVB-Service Information (DVB-SI) in the case of the DVB scheme.

Figure 4:
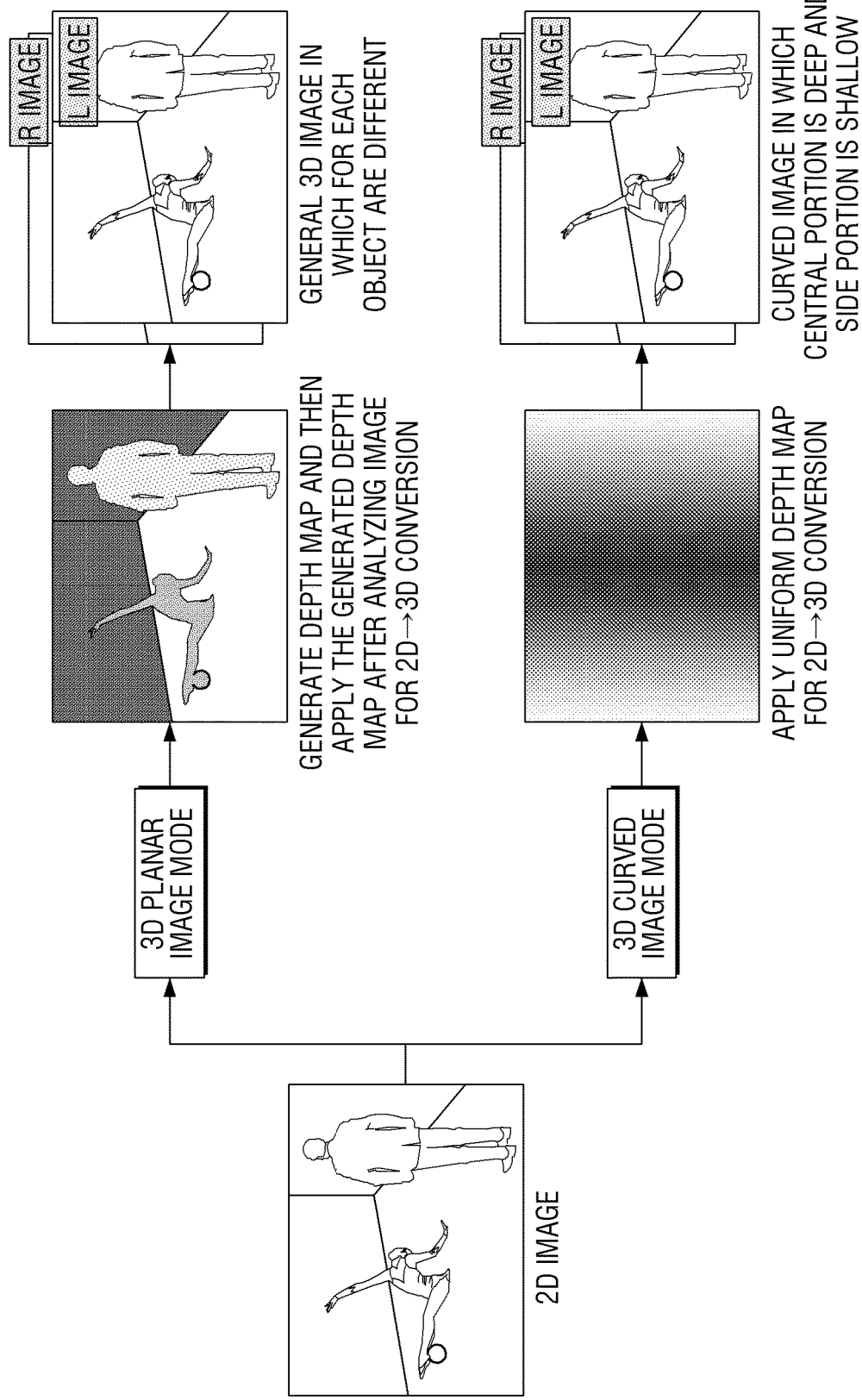
FIG. 4 is a diagram illustrating a difference between a method for generating a 3D image frame in the 3D planar image mode and a method for generating a 3D image frame in the 3D curved image mode.

FIG. 4 is a diagram illustrating a difference between a method for generating a 3D image frame in the 3D planar image mode and a method for generating a 3D image frame in the 3D curved image mode.

Referring to FIG. 4 and the foregoing description, the user may input a display mode selection. If the 3D planar image mode is selected, the image is analyzed and the depth map is generated and applied. In this case, each object has different depth values. Further, the left-eye image frame and the right-eye image frame for each image frame are generated by shifting the image on the basis of different depths for each object. On the other hand, if the 3D curved image mode is selected, the depth map for the received image having the depth information corresponding to the predefined curvature is generated. In this case, each object does not have different depth values but each region of the screen has different depth values. That is, the depth value is reduced from a central portion of the screen toward a side portion thereof. The left-eye image frame and the right-eye image frame for each image frame are generated by shifting the image using the depth map.

Figure 5:
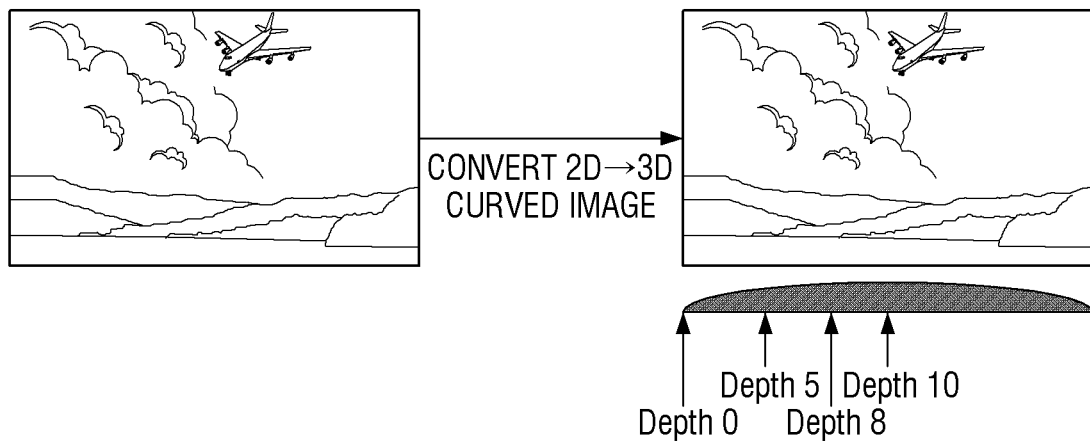
FIG. 5 is a diagram illustrating depth values for each region of a screen in the 3D image generated by the exemplary embodiment of the present disclosure.

FIG. 5 is a diagram illustrating depth values for each region of a screen in the 3D image generated by the exemplary embodiment of the present disclosure.

As illustrated in FIG. 5, when converted into the curved image, the depth value is the largest at the central portion of the screen and the depth value is reduced toward the side portion. Therefore, the user feels as if the image of the central portion of the screen is located farther over the original image and the image of the side portion thereof is located nearer over the original image. Consequently, the user feels as if the images of each region of the screen are located at a similar distance, and therefore gets a feeling like viewing the curved display or viewing the panorama image.

Figure 6:
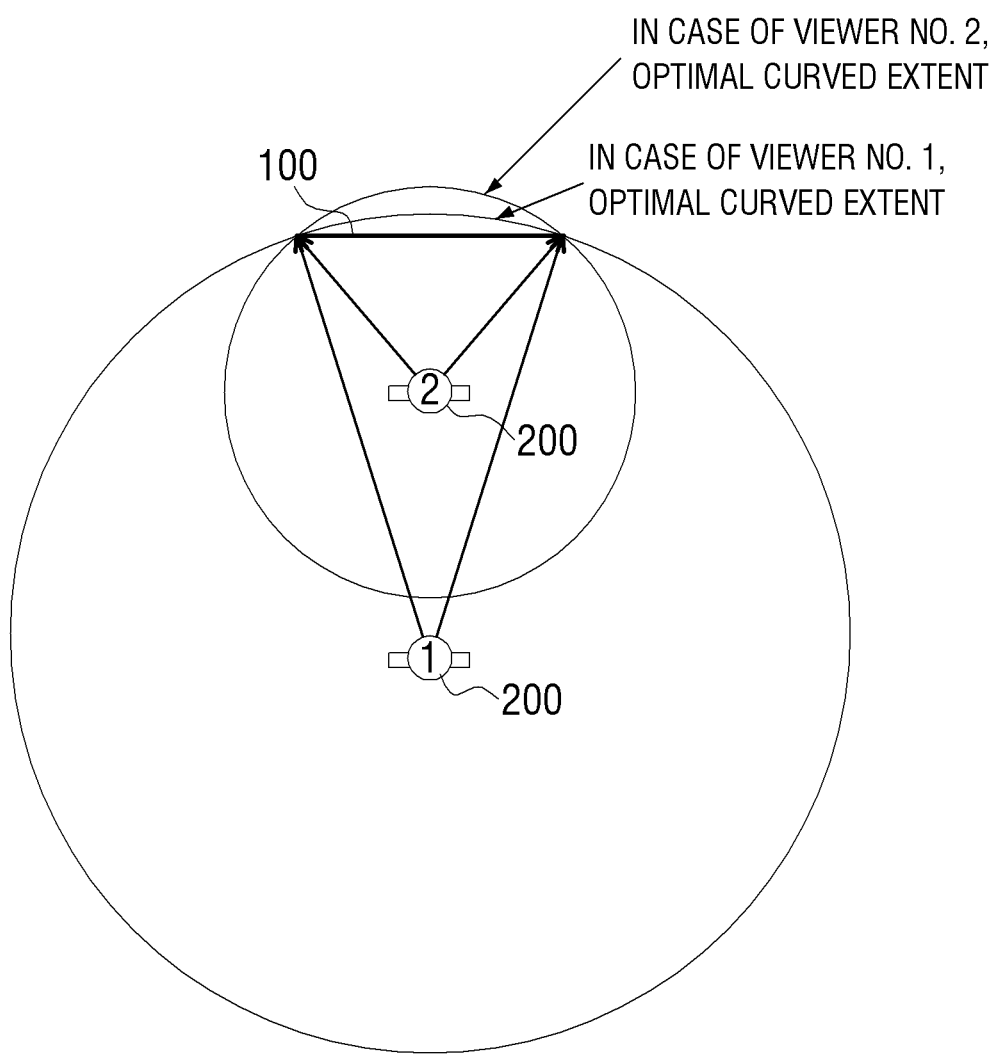
FIG. 6 is a diagram illustrating a change in curvature of an image according to a user location.

FIG. 6 is a diagram illustrating a change in curvature of an image according to a user location.

Referring to FIG. 6, when the user is located relatively closer to the image display device 100 (user represented by No. 2), a curvature radius of the image that the user feels may be relatively small. The reason is that all the regions of the image need to be in a visible range. On the other hand, when the user is located relatively farther away from the image display device 100 (user represented by No. 1), the curvature radius of the image that the user feels may be relatively large. Therefore, the user needs to be able to select the curvature radius according to his/her location or taste.

The present disclosure provides a user input means for the curvature selection. That is, the foregoing input unit 120 may receive the user input for the curvature selection. The foregoing display may display a user menu for the curvature selection. The user may select his/her desired curvature using a remote control or other input means. For example, the user No. 2 may select a relatively larger curvature. On the other hand, the user No. 1 performs a user input for selecting a relatively smaller curvature. Based on this, the curved extent of the image is determined.

The menu for the curvature selection may be displayed by being replaced by another menu item for the curvature selection. For example, the viewing distance of the user may be displayed and the input unit 120 may receive the user input selecting the viewing distance. In this case, the depth map generator 140 selects the curvature on the basis of the selected viewing distance.

If the curvature is selected, the depth map generator 140 generates the depth map for the received image having the depth information corresponding to the selected curvature.

FIG. 7 is a diagram illustrating the change in curvature according to a kind of circles.

As illustrated in FIG. 7, if the selected display mode is the 3D curved image mode, the depth map generator 140 may generate the depth map for the received image having the depth information corresponding to the curvature of the oval.

Hereinafter, an image display device according to another exemplary embodiment of the present disclosure supporting a 2D curved image mode will be described.

Figure 8:
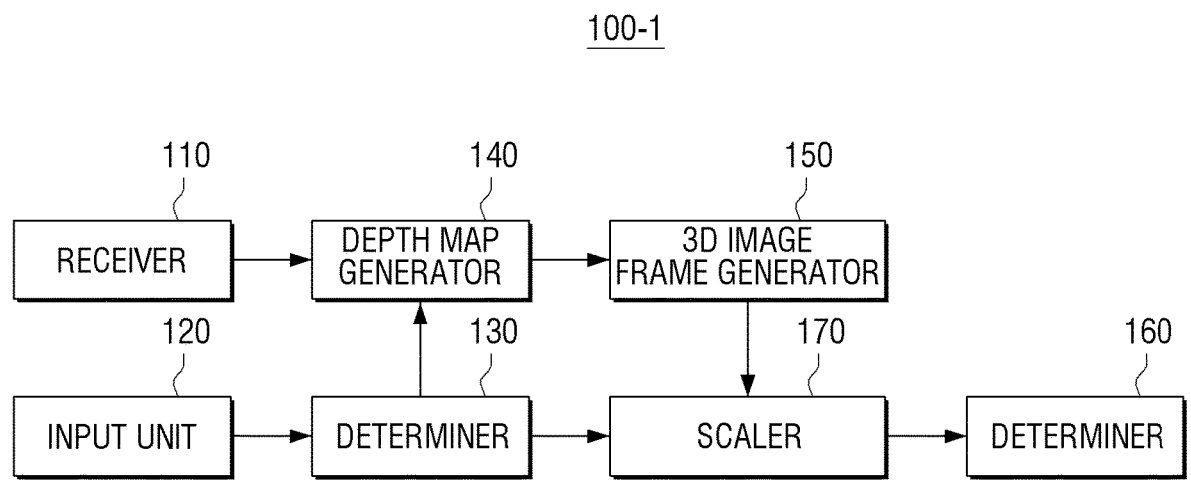
FIG. 8 is a block diagram illustrating a configuration of an image display device according to another exemplary embodiment of the present disclosure.

FIG. 8 is a block diagram illustrating a configuration of an image display device according to another exemplary embodiment of the present disclosure.

Referring to FIG. 8, an image display device or an image signal output device 100-1 according to another exemplary embodiment of the present disclosure includes the receiver 110, the input unit 120, the depth map generator 140, the 3D image frame generator 150, the scaler 170, and the output unit 160.

The receiver 110, the input unit 120, the depth map generator 140, the determiner 130, the 3D image frame generator 150, and the output unit 160 are already described, and therefore the overlapping description thereof will be omitted.

The scaler 170 is configured to scale the received image on the basis of the predefined scaling ratio.

The scaling means a multiplication of a constant by a distribution range of a pixel value to let the distribution range of the pixel value be in a predefined range. The case in which the predefined range is larger than the distribution range of the pixel value of the first image data is referred to as up-scaling and as the result of the up-scaling, the screen of the image data is up-scaled to a predefined ratio. On the other hand, the case in which the predefined range is smaller than the distribution range of the pixel value of the input image data is referred to as down-scaling and as the result of the down-scaling, the screen of the image data is down-scaled to a predefined ratio. In the case of the up-scaling, one pixel value on the input image data may match a plurality of pixel values of the image data screen as the result of the scaling, and therefore the resolution may be reduced. The down scaling is made in a form in which some of the overlapping pixel values are omitted.

When the scaling ratio is set, the scaler 170 scales the 2D image frame (or 3D image frame) on the basis of the set scaling ratio. As described above, the scaling means an operation of up-scaling or down-scaling the image frame of the image data to the predefined ratio. For example, if one pixel of the image data consists of (R1G1B1), when the two-fold up-scaling is performed in the horizontal direction, two pixels corresponding to the scaled image data are changed to the (R1G1B1) and thus becomes (R1G1B1)(R1G1B1).

In particular, the scaler 170 may scale the received image to have different scaling ratios for each region of the screen.

Figure 9:
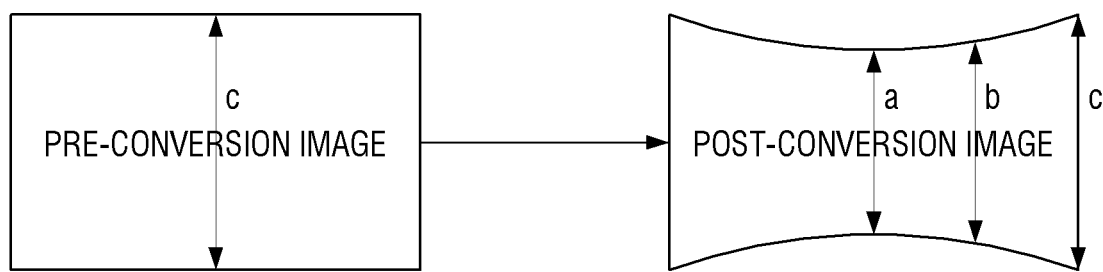
FIG. 9 is a reference diagram illustrating a scaling method according to an exemplary embodiment of the present disclosure.

FIG. 9 is a reference diagram illustrating a scaling method according to an exemplary embodiment of the present disclosure.

If the selected display mode is the 2D curved image mode, the scaler 170 according to an exemplary embodiment of the present disclosure may increase the down-scaling extent from the side portion of the received image toward the central portion thereof to perform the scaling.

Referring to FIG. 9, it can be appreciated that the distribution range of the pixel value of the pre-conversion image extends over length C and the distribution range of the pixel value of the post-conversion image reaches length a at the central portion of the image, reaches b larger than the a at a lateral region thereof, and reaches c larger than the b at the edge region thereof. According to the method, a pixel line is gradually shortened from the side portion of the screen toward the central portion thereof, by a pixel line in a vertical direction.

As illustrated in FIG. 9, the post-conversion image has a shape in which it is incorporated vertically while the image content is maintained as it is. The image gives the optical illusion like the panorama image to the user and gives immersion to the user.

Figure 10:
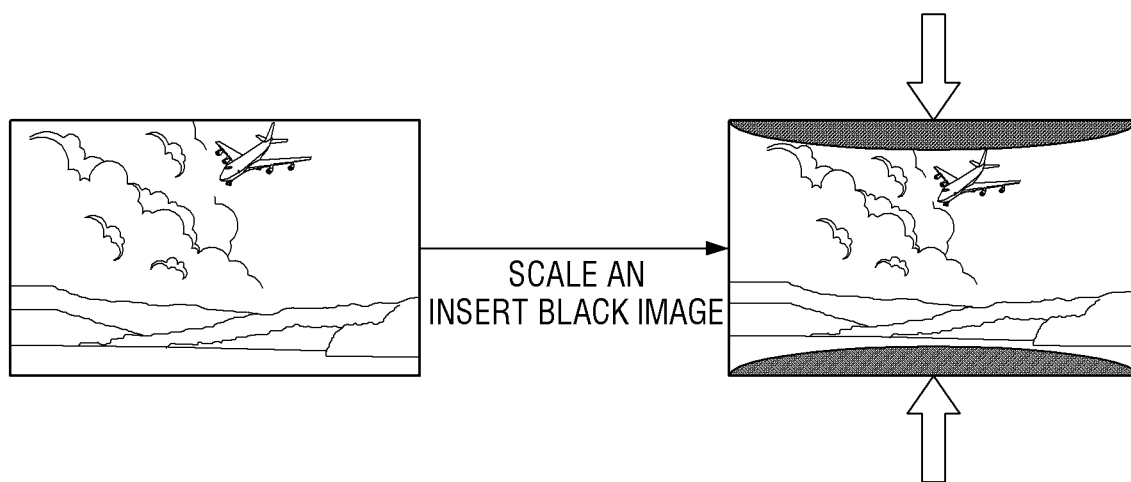
FIG. 10 is a diagram illustrating a final screen of a 2D curved image mode.

FIG. 10 is a diagram illustrating a final screen of a 2D curved image mode.

As the result of the scaling, the scaler 170 may fill a void region occurring due to the scaled image down-scaled over the received image with a black image since. That is, as illustrated in FIG. 10, the image is down-scaled to prevent the incorporated image from being located in upper and lower regions of the screen and therefore the upper and lower region is filled with the black image. However, filling the region with the black image is one example, and therefore the region may also be filled with another image or an image interpolated in the original image.

Figure 11:
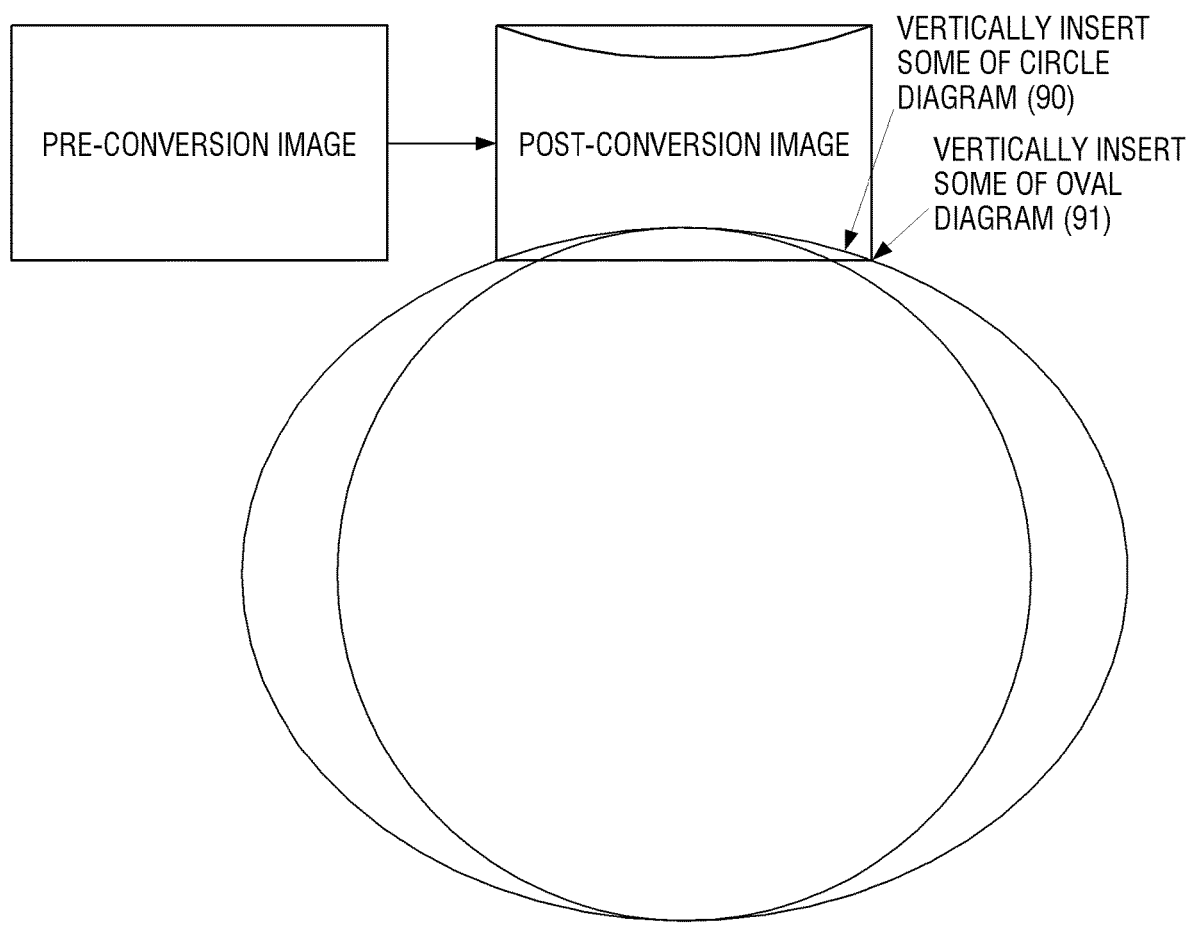
FIG. 11 is a diagram illustrating an example in which different scaling ratios are set, according to an exemplary embodiment of the present disclosure.

FIG. 11 is a diagram illustrating an example in which different scaling ratios are set, according to an exemplary embodiment of the present disclosure.

The scaler 170 may scale each region of the image on the basis of the setting of different scaling ratios. This may be set by the user input. That is, the foregoing input unit 120 may receive the user input for selecting one of first scaling ratio setting performing the scaling on each region of the image on the basis of the first scaling ratio and second scaling ratio setting performing the scaling on each region of the image on the basis of the second scaling ratio. As illustrated in FIG. 11, the scaling ratio setting may be made so that a curvature formed by upper and lower surfaces of the post-conversion image becomes the curvature of the circle 90 or the curvature of the oval 91.

Next, an image display method according to various exemplary embodiments of the present disclosure will be described.

Figure 12:
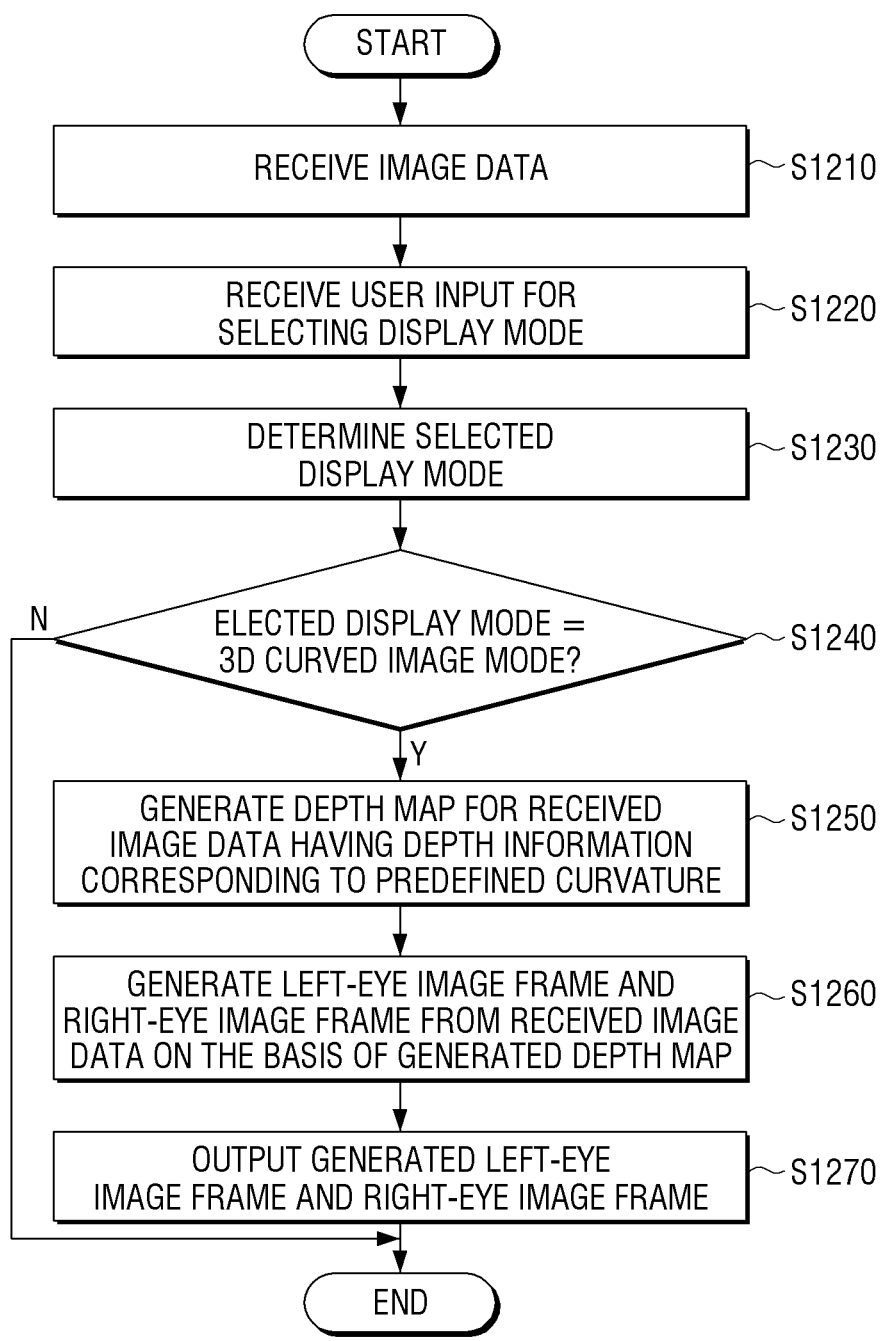
FIGS. 12 and 13 are flow charts of an image display method according to an exemplary embodiment of the present disclosure.
Figure 13:
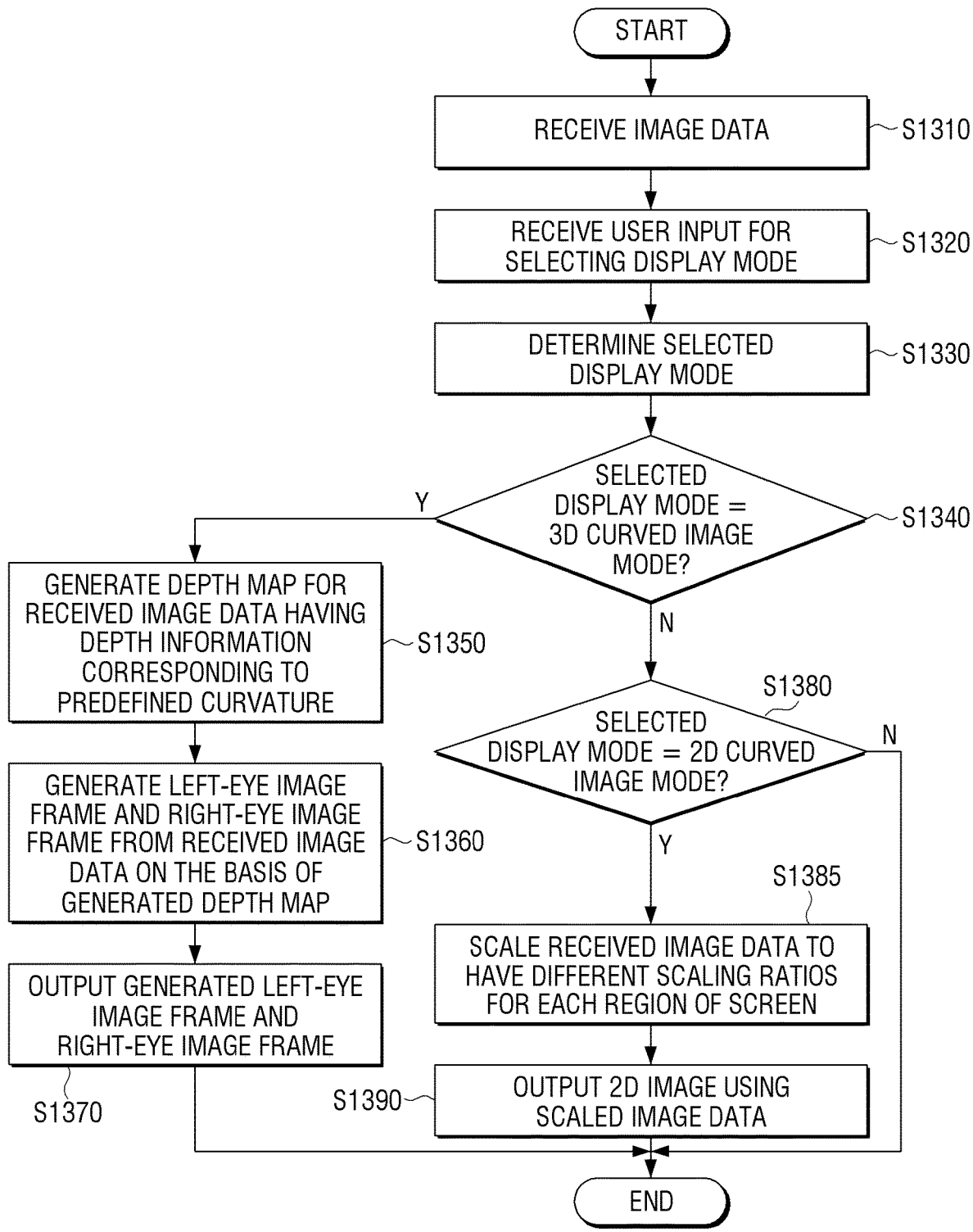

FIGS. 12 and 13 are flow charts of an image display method according to an exemplary embodiment of the present disclosure.

Referring to FIG. 12, the image display method according to one exemplary embodiment of the present disclosure includes receiving an image data (S1210), receiving a user input for selecting a display mode (S1220), determining the selected display mode (S1230), if the result of the determination indicates that the selected display mode is a curved image mode (S1240-Y), generating a depth map for the received image data having depth information corresponding to the predefined curvature (S1250), generating a left-eye image frame and a right-eye image frame from the received image data on the basis of the generated depth map (S1260), and outputting the generated left-eye image frame and right-eye image frame (S1270).

In this case, in the generating of the depth map, if the result of the determination indicates that the selected display mode is the 3D planar image mode, the depth map having the depth information on each region of the received image may be generated.

Further, in the generating of the depth map, if the result of the determination indicates that the selected display mode is the 3D curved image mode, the depth map for the received image having the depth information corresponding to the curvature of the circle or the oval may be generated.

Further, the generated depth map may include the depth value reduced from the central portion of the received image toward the side portion thereof.

The image display method may further include displaying a user menu for selecting the display mode.

Further, the image display method may further include receiving the user selection for the curvature selection, and if the user input for the curvature selection is received, in the generating of the depth map, the depth map for the received image having the depth information corresponding to the selected curvature may be generated.

Further, in the outputting, if the result of the determination indicates that the selected display mode is the 2D planar image mode, the 2D image may be output using the received image without generating the depth map, the left-eye image frame, and the right-eye image frame.

Referring to FIG. 13, an image display method according to another exemplary embodiment of the present disclosure includes receiving an image data (S1310), receiving a user input for selecting a display mode (S1320), determining the selected display mode (S1330), if the result of the determination indicates that the selected display mode is a curved image mode (S1340-Y), generating a depth map for the received image data having depth information corresponding to the predefined curvature (S1350), generating a left-eye image frame and a right-eye image frame from the received image data on the basis of the generated depth map (S1360), and outputting the generated left-eye image frame and right-eye image frame (S1370).

The image display method may further include: if the result of the determination indicates that the selected display mode is the 2D curved image mode (S1380-Y), scaling the received image to have different scaling ratios for each region of a screen (S1385) and outputting a 2D image using the scaled image data (S1390).

In this case, in the scaling, if the selected display mode is the 2D curved image mode, the down-scaling extent may be increased from the side portion of the received image toward the central portion thereof to perform the scaling.

Further, in the scaling, as the result of the scaling, the void region occurring due to the scaled image down-scaled over the received image may be filled with the black image.

Meanwhile, the foregoing image display method may be stored in a non-transitory recording medium readable by a computer in a program form. Here, the non-transitory readable medium is not a medium that stores data therein for a while, such as a register, a cache, or the like, but means a medium that semi-permanently stores data therein and is readable by an electronic device. For example, the non-transitory readable medium may be a CD, a DVD, a hard disc, a Blue-ray disc, an USB, a memory card, an ROM, etc.

Further, the foregoing image display method may be provided while being embedded in a hardware IC chip in an embedded software form and may be included as some components of the foregoing multi content view display device or the image signal output device 100.

Although exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the invention as disclosed in the accompanying claims. These modifications should also be understood to fall within the scope of the present disclosure.

The invention claimed is:

1. An image display device, comprising:
a receiver configured to receive image data;
a flat display panel to display the image data; and
a processor configured to:
receive a user input selecting from an image display mode including a planar image mode and a 3D curved image mode, representing an image processing method,
based on the 3D curved image mode being selected via the user input, obtain a depth map having different depth values for a plurality of regions of the flat display panel, the different depth values of the depth map corresponding to a curvature predetermined for the 3D curved image mode,
obtain a 3D image frame including a left-eye image frame and a right-eye image frame by shifting the image data received through the receiver using the depth map, wherein the received image data has the same depth value, and
control the image display device to display the left-eye image frame and the right-eye image frame on the flat display panel.

2. The image display device of claim 1, wherein, based on the image display mode being a 3D planar image mode, the processor obtains the depth map having depth information on each region of the received image data.

3. The image display device of claim 1, wherein the processor obtains the depth map having depth information corresponding to a curvature of an oval.

4. The image display device of claim 1, wherein the depth map has the depth values reduced from a central portion toward a side portion.

5. The image display device of claim 1, wherein the user input is received through the display that displays a user menu for changing the image display mode.

6. The image display device of claim 1, wherein, based on the user input including a curvature selection, the processor obtains the depth map having depth information corresponding to the curvature selection.

7. The image display device of claim 1, wherein, based on the image display mode being a 2D planar image mode, the processor controls the display to display a 2D image using the received image without obtaining the depth map, the left-eye image frame, and the right-eye image frame.

8. An image display device, comprising:
a receiver configured to receive image data;
a flat display panel to display the image data; and
a processor configured to:
receive a user input selecting from an image display mode including a planar image mode and a 3D curved image mode, representing an image processing method,
based on the 3D curved image mode being selected via the user input, obtain a depth map having different depth values for a plurality of regions of the flat display panel, the different depth values of the depth map corresponding to a curvature predetermined for the 3D curved image mode,
obtain a 3D image frame including a left-eye image frame and a right-eye image frame by shifting the image data received through the receiver using the depth map, wherein the received image data has the same depth value, and
control the flat display panel to display the left-eye image frame and the right-eye image frame,
wherein, based on the display mode being a 2D curved image mode, the processor scales the received image to have different scaling ratios for each region of the plurality of regions of the flat display panel, and controls the flat display panel to display the scaled image.

9. The image display device of claim 8, wherein, based on the image display mode being the 2D curved image mode, the processor has a down-scaling extent increased from a side portion of the received image toward a central portion thereof to perform the scaling.

10. The image display device of claim 8, wherein as a result of the scaling, the processor fills a void region occurring due to the scaled image down-scaled over the received image with a black image.

11. An image display method of an image display device, comprising:
   receiving an image;
   receiving a user input selecting from an image display mode including a planar image mode and a 3D curved image mode, representing an image processing method;
   based on the 3D curved image mode being selected via the user input, obtaining a depth map having different depth values for a plurality of regions of the flat display panel, the different depth values of the depth map corresponding to a curvature predefined for the 3D curved image mode;
   obtaining a 3D image frame including a left-eye image frame and a right-eye image frame by shifting the received image data using the depth map, wherein the received image data has the same depth value; and
   displaying the left-eye image frame and right-eye image frame on a flat display panel of the image display device.

12. The image display method of claim 11, further comprising:
   based on the image display mode being the 3D planar image mode, obtaining the depth map having depth information on each region of the received image data.

13. The image display method of claim 11, wherein the obtaining the depth map comprises obtaining the depth map having depth information corresponding to a curvature of an oval.

14. The image display method of claim 11, wherein the obtained depth map has the depth value reduced from a central portion toward a side portion.

15. The image display method of claim 11, further comprising: displaying a user menu for selecting the display mode on the display.

\* \* \* \* \*